United States Patent Office 3,472,906
Patented Oct. 14, 1969

3,472,906
HYDROGENATION PROCESS
Hiepke Boerma and Johan van der Drift, Vlaardingen, Netherlands, assignors to Lever Brothers Company, New York, N.Y., a corporation of Maine
No Drawing. Continuation of application Ser. No. 559,115, June 21, 1966. This application Aug. 29, 1968, Ser. No. 756,737
Claims priority, application Great Britain, June 29, 1965, 27,461/65
Int. Cl. C07c *5/16*
U.S. Cl. 260—666  8 Claims

ABSTRACT OF THE DISCLOSURE

This disclosure is concerned with selectively hydrogenating non-conjugated polyenes to the corresponding cyclic monoolefins with a copper catalyst without any other metal showing a higher activity than copper. The reaction medium has hydrogen without a solvent.

---

This application is a continuation of an application Serial No. 559,115 filed June 21, 1966, now abandoned.

This invention relates to hydrogenation and especially to the hydrogenation of cyclic compounds containing two or more ethylenic bonds in the molecule.

The invention provides a method whereby cyclic polyenic hydrocarbons, especially those containing 8 to 24 carbon atoms in the ring, can be selectively hydrogenated to yield cyclic monoenic hydrocarbons. The process of the invention may be applied to the hydrogenation both of polyenic compounds in which the double bonds are conjugated (which are usually relatively easy to hydrogenate) and of those in which the double bonds are in isolated position.

Cyclic polyenic hydrocarbons, i.e. cyclic hydrocarbons containing two or more carbon to carbon double bonds, of the kind mentioned above include cyclododeca-1,5,9-triene, cyclododeca-1,5-diene, cycloocta-14-diene, cycloocta-1,3-diene, cycloocta-1-diene and cyclohexadeca-1,5,9,13-tetraene, and their substitution products, especially those in which the substituent is a saturated or aromatic group. Also mixtures of these starting materials, in particular of various cis-trans isomers which are often found together, can be used. In such products the substituent is preferably a saturated hydrocarbon radical, but other substituents, especially those of relatively low polarity such as ester or ether groups, also come into consideration. The presence of more polar groups, for instance hydroxy, carbonyl and carboxyl groups may render cyclic compounds in which they occur less suitable. Many of such substances can be obtained by oligomerisation reactions of butadiene, isoprene, piperylene, whereas butyns and/or other unsaturated compounds can be used in co-oligomerisation reactions. The term "oligomerisation" used below is to be understood to include co-oligomerisation.

The cyclic monoenic compounds obtained according to the invention may be used in the preparation of useful compounds such as 1,10-decanedicarboxylic acid, 11-amino-decane-1-carboxylic acid lactam, cyclododecanol, cyclododecanone or corresponding compounds containing more or less carbon atoms. In the preparation of these compounds it is usually desirable to use as a starting material only those cyclic hydrocarbons containing but one reactive double bond.

Hydrogenation of cyclic polyene compounds by previously available methods usually results in a complex reaction mixture. Thus, for instance, hydrogenation by such methods of cyclododeca-1,5,9-triene will usually result in reaction mixtures containing cyclododecane and the various isomeric forms of cyclododecene, cyclododecadiene and of the trienic starting material. As the separation of the compounds of a specific unsaturation in the molecule is difficult and as in particular the presence in substantial amount of polyenic cyclic compounds having a plurality of vulnerable double bonds is objectionable in the course of further reactions, it is desirable to provide a relatively simple method by means of which cyclopolyenic compounds can be hydrogenated selectively into monoenic compounds of good quality.

Processes purporting to effect some degree of selective hydrogenation of such cyclic compounds by the use of a partially poisoned normally rather unselective catalyst in the presence of a so-called displacement solvent (also sometimes referred to as a hydrogen donor) have been proposed. The partially poisoned catalysts, however, for instance sulphided nickel catalysts, have the drawback that they are relatively inactive and so must be used in comparatively high quantities at high temperatures and for long reaction periods. Moreover, nickel sulphide catalysts show pronounced isomerising properties leading among other things to the formation of objectionable amounts of unstable polyenic compounds. The presence of these proportions of unstable compounds affects the stability, especially the colour, of the filtered product formed especially upon storage.

The so-called displacement solvents proposed were solvents which, by virtue of their affinity for the catalyst, were expected to function by displacing the monoenic compound by desorption from the catalyst surface so that the monoenic compound would not be hydrogenated to the fully saturated compound.

The present invention provides a method for the selective hydrogenation of cyclic polyenic compounds to cyclic monoenic compounds using a copper-containing catalyst. An important feature of the catalyst that has been found most successful is that the metal part of the active material consists of more than 95% of the element copper. The chemical state of the element copper in the catalyst can be symbolized by $Cu^{x+}$, in which $x$ may have a value ranging from 0 to slightly below 2. A wide variety of such catalysts is available. The active material may be dispersed on carriers such as, for example, silica, magnesium oxide, zinc oxide, diatomaceous earth, activated clay, activated carbon, aluminum oxide, chromium oxide, asbestos, iron oxide, titanium oxide or the like or combinations of these. Suitable catalysts are: $Cu/MgO/SiO_2$, $Cu/Al_2O_3$, $Cu/MgO$, Cu/diatomaceous earth, Cu-formate, $Cu/Cr_2O_3$ and $Cu/Cr_2O_3/BaO$. It is desirable that the active copper-containing material is dispersed on a carrier, but the carrier should not be of such a nature as to impair the catalytic activity of the copper. Other metals, e.g. Ni, Pt, Pd, Fe and Co, particularly those showing higher catalytic activity than copper, should preferably not exceed some 5% of the metal part of the active material of the catalyst, since the presence of those metals in substantial proportions has been found to decrease the selectivity. Catalysts used according to the invention may be obtained by precipitating copper compounds from solutions by means of an alkaline reagent with or without co-precipitation of other compounds, optionally in the presence of a carrier, after which the precipitate is dried. With certain types of catalysts a subsequent heat treatment may be of advantage (for instance thermal decomposition without substantial sintering may be effected).

Another method is to impregnate a suitable support, for instance diatomaceous earth, silica gel or charcoal, with an aqueous solution of a copper salt and to dry the impregnated material. Yet another method is to mix the dry copper compound with a carrier and to heat the mixture. Sometimes, depending on the selected reaction temperature, it is advantageous to pre-reduce the catalyst, but usually this occurs in the first stage of the hydrogenation.

The amount of catalyst used is not very critical and is mainly dependent on the activity of the catalyst, but other factors, such as the presence of contaminants in the material to be hydrogenated, which may have a poisoning effect, are of importance. The amount used usually varies between 0 and 20% by weight of the catalyst calculated on the weight of the substance to be hydrogenated. Preferably the amount of catalyst will vary between 1 and 5% calculated as indicated above.

The reaction temperatures employed also depend on the activity of the catalyst employed, as a low activity can be partly compensated for by employing higher temperatures, and is further affected by the nature of the substance to be hydrogenated in particular by the thermal stability. Reaction temperatures ranging between 20 and 300° C., preferably between 150 and 220° C., have been employed.

According to the invention the hydrogenation may be carried out at widely diverging hydrogen pressures, for instance between 1 and 200 atm. Pressures below 2 atm. have the drawback that they will cause the reaction to proceed only at a slow rate unless high amounts of catalyst are used. Consequently it is preferred to carry out the reactions in an autoclave at pressures between 2 and 100 atm., and especially between 2 and 30 atm.

Thus in the case of the selective hydrogenation of cyclododeca-1,5,9-triene it was found that optimal results were obtained with 2.0% of a $Cu/MgO/SiO_2$ catalyst containing about 40% of copper at a reaction temperature of 185° C. and an average hydrogen pressure of 10 atm., for which a reaction time of 30 minutes was needed.

The process according to the invention provides a method for selective hydrogenation among the advantages of which are the following:

(1) High yield (80 to 100%) of monoenic compounds depending on the nature of the starting material used. Generally the yields decrease slightly when the molecular weight of the starting material increases.
(2) High intrinsic catalytic activity resulting in short reaction times (1 to 60 minutes) in combination with low catalyst concentrations (1 to 5%);
(3) The process can be carried out at pressures below 30 atmospheres at relatively low catalyst concentrations whilst maintaining a relatively high reaction rate and a high selectivity.
(4) The presence of a solvent is not required owing to the high selectivity;
(5) The products obtained according to the invention are more stable than those obtainable under comparable conditions using nickel sulphide catalyst and can be used without further purification;
(6) The catalyst can be easily prepared and is relatively cheap.

As to the starting materials employed, the various technical grades of the cyclopolyenic hydrocarbons can be used, provided that they do not contain appreciable amounts of contaminants such as polymerisation inhibitors impairing the activity of the catalyst. Thus it has sometimes been found advantageous to subject the starting material to a purification step comprising treatment with an absorbent such as activated alumina, or to distillation. The technical grades of the polyenic compounds usually consist of mixtures of various isomeric forms, but of course the various isomeric forms may be selectively hydrogenated according to the invention.

Although there is in general little advantage in the use of a solvent, an inert solvent may be used.

Hydrogen addition is preferably stopped when an iodine value has been reached of approximately the theoretical value of the monoenic compound. As refractive index and degree of unsaturation are closely related, it is convenient to record the refractive index and stop at the desired value. Subsequently the catalyst is removed by filtration.

As indicated above an important application of the invention is the production from cyclic polyenic compounds especially hydrocarbons of the corresponding cyclic monoenic compounds uncontaminated by substantial proportions of polyenic compounds and saturated compounds. Ideally such polyenic compounds should be completely absent but small proportions amounting for instance to some 5 to 10 or even 12.5% of the final reaction mixture may not be objectionable, especially when composed mainly of cyclic unconjugated hydrocarbons.

As indicated above the copper-containing catalysts employed show a high degree of selectivity in the reduction of cyclic polyenes to cyclic monoenes in that they catalyse the reduction of the cyclic polyenes more rapidly than that of the cyclic monoenes. This makes it a simple matter to control the nature of the product by stopping the hydrogenation at an appropriate point, for instance when most of the initial polyene has been converted into monoene and before much of this has been converted into corresponding saturated cyclic compounds. Thus for instance the hydrogenation can be stopped when the polyene content of the product has been diminished to 12.5% or less, e.g. 10 to 5 or even 5 to 0%, but before the monoene content has fallen below 70 or 75% and preferably while it is considerably higher e.g. 80 to 90% or even 90 to 100%. The progress of the reduction can be followed by determinations of refractive index and, as shown in Example 1, preliminary trials will indicate for particular conditions an appropriate refractive index at which to stop.

The invention will be illustrated with reference primarily to the hydrogenation of cyclododeca-1,5,9-triene since this gives products of particular interest, for instance for the preparation of monomers for use in polycondensation reactions such as are involved in the production of polyamides. The same method can however be used with advantage in hydrogenating other cyclic polyenes including those specified above.

EXAMPLE 1

This example relates to the hydrogenation of cycloocta-1,5-diene to cyclooctene.

A 1-litre rocking autoclave was charged with 200 g. cyclo-1,5-octadiene purified over a column filled with alumina ($n_D^{20}$ 1.4934; I.V. 469) and 5 g. of a copper chromite catalyst (ex. Degussa, sold as a 2 $CuO/Cr_2O_3$ catalyst activated with $Ba_2CrO_4$, copper content about 40%).

Hydrogen gas was added to the autoclave to a pressure of 5 atm. and the system was heated to 185° C. Subsequently the autoclave was washed with hydrogen three times in order to remove any water liberated during the activation of the catalyst. After that hydrogen was introduced to a pressure of 30 atm. The hydrogen uptake took place rather fast. When a pressure of 20 atm. was reached, additional hydrogen was pressed into the autoclave. This had to be repeated several times; the amount of hydrogen added was recorded. Consequently hydrogen pressure varied during the reaction between 20 and 30 atm. Owing to the reaction heat set free the temperature of the mixture increased to 215° C.

Samples were drawn from the autoclave at various intervals after the hydrogen was introduced to a pressure of 30 atm. for the first time. The refractive index of the samples was measured. The samples were subsequently filtered and their contents of cyclooctane, cyclooctene and cyclooctadiene were analysed by means of gas-liquid chromatography.

The results are given in the following table:

| Time of reaction in minutes | Hydrogen uptake in atm. | Refractive index $n_D^{20}$ | Cyclooctane | Cyclooctene | Cyclooctadiene |
|---|---|---|---|---|---|
| 3 | 60 | 1.4740 | 4 | 76.5 | 20 |
| 5 | 72 | 1.4713 | 5 | 86 | 9 |
| 8 | 82 | 1.4696 | 7 | 91.5 | 1.5 |
| 20.5 | 90 | 1.4686 | 10.5 | 89.5 | |
| 65.5 | 100 | 1.4668 | 28 | 72 | |

From the above data it was calculated that in the case of theoretical ideal selective hydrogenation to cyclooctene the hydrogen uptake would have amounted to 88 atm.

By plotting the figures of the table mentioned above it was estimated that under the prevailing reaction conditions a maximum yield of 92% cyclooctene could be obtained at a hydrogen uptake of 85 atm. and that this could be attained in a reaction time of 9 minutes. It was further established that in order to obtain the maximum yield mentioned above the reaction should be stopped when the refractive index at 20° C. of the reaction mixture is 1.4690.

EXAMPLE 2

A 1-litre stirred autoclave provided with a cooling coil was charged with 250 g. of the same purified cycloocta-1,5-diene used in Example 1 and 6 g. of a non-activated Cu/MgO/SiO$_2$ catalyst containing 40% copper (prepared by co-precipitating a solution of copper sulphate, magnesium sulphate and water-glass with sodium carbonate at 100° C.).

The autoclave was washed three times with hydrogen and subsequently hydrogen was introduced at a pressure of 20 atm. The autoclave was heated to 150° C. under constant stirring and again washed three times with hydrogen, after which hydrogen was introduced to a pressure of 30 atm.; the temperature quickly rose to 190° C. Whenever the hydrogen pressure had fallen to 20 atm., additional hydrogen was introduced to a pressure of 30 atm.

The heat of reaction evolved during the hydrogenation was removed by means of a cooling coil in the autoclave through which a mixture of glycerol and water was circulated. After 10 min. the hydrogen uptake slowed down and the hydrogenation was interrupted after 16 min. The contents were withdrawn, filtered and analysed by means of gas-liquid chromatography. The results were as follows: $n_D^{25}$ 1.4671; the product contained 6% cyclooctane and 94% cyclooctene.

EXAMPLE 3

In an experiment similar to Example 2, 250 g. cyclooctadiene and 5 g. catalyst were heated under a pressure of 5 atm. to 170° C., the autoclave was washed three times with hydrogen with the hydrogenation carried out at 205° C. and 6-4 atm. After 35 min. the hydrogenation slowed down and was interrupted after 45 min. The product ($n_D^{25}$ 1.4651) consisted of: 3% cyclooctane and 97% cyclooctene.

EXAMPLE 4

In an experiment similar to Example 2 with 250 g. cyclooctadiene and 5 g. activated Cu/MgO/SiO$_2$ catalyst, the activation was carried out by heating the catalyst in hydrogen at 200° C. for 1 hour at a pressure of 5 atm. and 185° C. the following results were obtained: hydrogenation time 32 min., $n_D^{25}$ 1.4642 and composition 2% cyclooctane and 98% cyclooctene.

EXAMPLE 5

A 1-litre rocking autoclave was charged with 250 g. purified cyclododeca-1,5,9-triene ($n_D^{20}$ 1.5063; consisting of 97% cis, trans, trans-isomer and 3% trans, trans, trans-isomer; I.V. 464 Wijs method) and 2.5 g. of a non-activated Cu/MgO/SiO$_2$ catalyst (prepared by co-precipitating a solution of copper sulphate, magnesium sulphate and water-glass with Na$_2$CO$_3$ at 100° C.) containing about 40% copper.

After having washed the autoclave several times with nitrogen and hydrogen, the system was heated at a hydrogen pressure of 10 atm. to a temperature of 185° C.

After 15 minutes the autoclave was washed three times to remove any water liberated during the activation of the copper catalyst. Hydrogenation was carried out at about 185° C. and under an average hydrogen pressure of 25 atm. After the uptake of 125 atm. of hydrogen several samples were drawn and the corresponding uptake of hydrogen was recorded. The refractive indexes were measured and the samples analysed by gas-liquid chromatography after filtering off the catalyst.

The results are given below:

| Time of reaction in minutes | Hydrogen uptake in atm. | $n_D^{65}$ | Cyclododecane | Cyclododecene | Cyclododecadiene plus cyclododecatriene |
|---|---|---|---|---|---|
| 42 | 128.5 | 1.4692 | 6 | 75 | 20 |
| 49 | 135 | 1.4676 | 11.5 | 81 | 7.5 |
| 56 | 141 | 1.4667 | 19 | 74 | 7 |

Under the prevailing reaction conditions 81% cyclododecene could be obtained within a reaction time of about 50 minutes.

The purity and stability of the final product obtained according to this example were compared with those of the product obtained under similar conditions but using a nickel sulphate catalyst and applying a corresponding higher pressure. These products were examined spectroscopically and the extinction of the product at 2790 A. was determined in a 1 cm. cell, which is considered an index for the relative stability of the crude monoenic compound; also a sample of 25 ml. of each of the crude products was heated to 100° C. and kept at that temperature while blowing air (5 litres/hour) through the liquid and the products were examined before and after this treatment in the Lovibond colorimeter using a 1" cell. The extinction at 2790 angstrom units was also measured after the heat treatment. The results of these tests, and the refractive indices of the various products are shown below:

| Sample | $n_D^{65}$ | $E_{2790}$ A. | Lovibond colour→yellow |
|---|---|---|---|
| NiS product: | | | |
| Untreated | 1.4668 | 5.5 | 0.1 |
| Treated (25 ml.) | 1.4678 | 18.0 | 0.6 |
| Cu product: | | | |
| Untreated | 1.4667 | 1.1 | <0.1 |
| Treated (25 ml.) | 1.4667 | 1.4 | <0.1 |

EXAMPLE 6

Example 5 was repeated, except that the autoclave was charged with 250 g. of the same purified cyclododeca 1,5,9-triene of Example 5 and 5 g. of a Cu/MgO/SiO$_2$ catalyst (the same as in Example 5) which contained 40% of copper.

The results obtained are tabulated below:

| Time of reaction in minutes | Hydrogen uptake in atm. | $n_D^{65}$ | Cyclododecane | Cyclododecene | Cyclododecadiene plus cyclododecatriene |
|---|---|---|---|---|---|
| 32 | 116 | 1.4687 | 6.5 | 77.5 | 16.5 |
| 39 | 123 | 1.4674 | 10 | 79 | 11 |
| 57 | 136 | 1.4641 | 27.5 | 70 | 2.5 |

In this way a yield of 79% cyclododecene could be obtained in a reaction time of 39 minutes.

EXAMPLE 7

Example 6 was repeated, using a 1-litre stirred autoclave as described in Example 2, 5 g. of the same Cu/MgO/SiO$_2$ catalyst as in Example 6 containing about 40% copper and 250 g. purified cyclododecatriene of Example 6. Experiments were carried out under different conditions and the results are given in the following table:

| Hydrogenation temp., ° C. | Pressure, atm. | Hydrogenation time, min. | $n_D^{65}$ | Cyclododecane, percent | Cyclododecene, percent | Cyclodienes, percent | Cyclotrienes, percent |
|---|---|---|---|---|---|---|---|
| 190 | 50 | 10 | 1.4668 | 12.5 | 79 | 7 | 1.5 |
| 190 | 25 | 19 | 1.4668 | 11.5 | 81 | 6.5 | 1 |
| 190 | 10 | 81 | 1.4665 | 13.0 | 83.5 | 3.5 |  |
| 190 | 5 | 310 | 1.4682 | 12 | 81 | 7 |  |

EXAMPLE 8

The experiments of Example 7 were repeated in the same autoclave with 250 g. of the same purified cyclododecatriene but with activated Cu%MgO/SiO₂ catalyst, activated in hydrogen by heating for 1 hour at 200° C. The results of these experiments are shown in the following table:

| Temp., ° C. | Pressure, atm. | Catalyst, g. | Hydrogenation time, min. | $n_D^{65}$ | Cyclododecane, percent | Cyclododecene, percent | Cyclodienes, percent | Cyclotrienes, percent |
|---|---|---|---|---|---|---|---|---|
| 190 | 5 | 10 | 44 | 1.4663 | 13 | 83.5 | 3 | 0.5 |
| 225 | 5 | 5 | 42 | 1.4691 | 9.5 | 82.5 | 8 |  |
| 205 | 5 | 5 | 43 | 1.4674 | 13 | 78 | 8 | 1 |
| 205 | 10 | 5 | 17 | 1.4670 | 11 | 83 | 5 | 1 |
| 205 | 25 | 5 | 6 | 1.4671 | 10.5 | 81.5 | 7 | 1 |
| 190 | 5 | 20 | 35 | 1.4669 | 11 | 86.5 | 2.5 |  |

EXAMPLE 9

The experiments of Example 8 were repeated, using a 0.3 liter stirred autoclave with adjustable stirring speed and with cooling coil. Now 100 g. purified cyclododeca-1,5,9-triene and 2 g. activated Cu/MgO/SiO₂ catalyst were used. The washing with hydrogen was carried out in the same way as described in Example 2. Hydrogenations were carried out at 190° C. and a pressure of 6–4 atm. The results are shown in the following table:

| Stirring speed, r.p.m. | Hydrogenation time, min. | $n_D^{65}$ | Cyclododecane, percent | Cyclododecene, percent | Cyclodienes, percent | Cyclotrienes, percent |
|---|---|---|---|---|---|---|
| 1,500 | 75 | 1.4666 | 8.5 | 84.5 | 5.5 | 1.5 |
| 2,000 | 58 | 1.4662 | 7.5 | 86.0 | 5.5 | 1.0 |
| 2,500 | 72 | 1.4660 | 8.0 | 86.0 | 5.0 | 1.0 |

EXAMPLE 10

The experiments of Example 8 were repeated with 250 g. purified cyclo-dodedeca-1,9-triene and 5 g. activated Cu/MgO/SiO₂ catalyst containing 1% Ni, Pd or Pt, respectively. For comparison an experiment with a catalyst without additions was carried out. The hydrogenations were carried out at 190° C. and 6–4 atm. The results are shown in the following table:

| Catalyst at— | Hydrogenation time, min. | $n_D^{65}$ | Cyclododecane, percent | Cyclododecene, percent | Cyclodienes, percent | Cyclotrienes, percent |
|---|---|---|---|---|---|---|
| 100% Cu | 117 | 1.4668 | 13 | 80 | 7 |  |
| 99% Cu, 1% Pd | 42 | 1.4662 | 17.5 | 72 | 8.5 | 2 |
| 99% Cu, 1% Pt | 50 | 1.4667 | 12 | 79.5 | 7 | 1.5 |
| 99% Cu, 1% Ni | 33 | 1.4665 | 16.5 | 73 | 8.5 | 2.5 |

EXAMPLE 11

Example 5 was repeated, except that the autoclave was charged with 250 g. purified cyclododeca-1,5,9-triene ($n_D^{20}$ 1.5043; I.V. 465.4 consisting of 51.5% trans, trans, trans-isomer, 39% cis, trans, trans-isomer and 9.5% of unknown constituents) and 5 g. of a Cu/MgO/SiO₂ catalyst (of Example 5) at 200° C. and at an average pressure of 25 atm. hydrogen.

The table below gives the results obtained:

| Time of reaction in minutes | Hydrogen uptake in atm. | $n_D^{65}$ | Cyclododecane | Cyclododecene | Cyclodecadiene plus cyclododecatriene |
|---|---|---|---|---|---|
| 10.5 | 145 | 1.4691 | 9.5 | 64 | 26.5 |
| 12 | 153 | 1.4675 | 13 | 79 | 9.5 |

Thus within a reaction time of 12 minutes a 79% yield of cyclododecene could be obtained.

EXAMPLE 12

Example 5 was repeated, except that the autoclave was charged with 250 g. purified cyclododeca-1,5,9-triene of Example 5 and 2.5 g. of a Cu/CrO₃ catalyst (ex. The Harshaw Chem. Co. U.S.A., Code No. Cu–0202P) containing 83% of copper.

The results obtained are tabulated below:

| Time of reaction in minutes | Hydrogen uptake in atm. | $n_D^{65}$ | Cyclododecane | Cyclododecene | Cyclodecadiene plus cyclododecatriene |
|---|---|---|---|---|---|
| 150 | 128 | 1.4703 | 6.5 | 74 | 19.5 |
| 170 | 138 | 1.4682 | 12.5 | 75 | 12.5 |
| 195 | 147 | 1.4668 | 17.5 | 75.5 | 7 |

Here a maximum yield of about 75% cyclododecene could be obtained in a reaction time of 195 minutes.

EXAMPLE 13

Example 2 was repeated in substance, but two modifications were made. The autoclave was charged with 250 g. purified cyclododeca-1,5,9-triene (same as in Example 5) and 2.5 g. of a Cu/Ba/Cr$_2$O$_3$ catalyst (same as used in Example 1).

The average hydrogen pressure was 25 atm. at a reaction temperature of 185° C. After the uptake of 95 atm. hydrogen (after 166 minutes), a quantity of 2.5 g. fresh catalyst was added and the reaction was continued after activation of the catalyst.

The results are tabulated below:

| Time of reaction in minutes | Hydrogen uptake in atm. | $n_D^{65}$ | Cyclododecane | Cyclododecene | Cyclodecadiene plus cyclodecatriene |
|---|---|---|---|---|---|
| 216 | 128 | 1.4692 | 5.5 | 75 | 19.5 |
| 246 | 135 | 1.4682 | 9 | 80.5 | 10.5 |

Here a maximum yield of about 80% of cyclododecene was attained, but the reaction time of 246 minutes is certainly not optimal, because the original amount of catalyst was evidently too low. With an initial addition of 5 g. catalyst the duration could be shortened appreciably.

EXAMPLE 14

A 1-litre stirred autoclave provided with a cooling coil was charged with 250 g. distilled technical cyclododeca-1,5,9-triene (97% cis, trans, trans and 3% trans, trans, trans-isomer) and 5 g. of a Cu/MgO/SiO$_2$ catalyst.

The autoclave was washed three times with hydrogen and subsequently hydrogen was introduced at a pressure of 20 atm. The autoclave was heated to 190° C. under constant stirring. The autoclave was washed again three times with hydrogen, after which hydrogen was introduced at a pressure of 30 atm. Whenever the hydrogen pressure had fallen to 20 atm., additional hydrogen was introduced at a pressure of 30 atm.

The reaction heat evolved during the hydrogenation was removed by means of a cooling coil in the autoclave through which a mixture of glycerol water was circulated. After the uptake of about 141 atm. of hydrogen a sample was drawn which was analysed by means of gas-liquid chromatography. Subsequently the reaction was continued for some minutes and the procedure repeated.

The results were as follows:

| Time of reaction in minutes | Hydrogen uptake in atm. | $n_D^{65}$ | Cyclododecane | Cyclododecene | Cyclododecadiene |
|---|---|---|---|---|---|
| 16 | 135 | 1.4675 | 8.5 | 83.0 | 8.5 |
| About 18.5 | 141 | 1.4664 | 11.5 | 83.0 | 5.5 |

In the polyene fraction no cyclododecatriene could be identified.

EXAMPLE 15

The procedure of Example 8 was repeated under the same conditions, but now 250 g. undistilled technical grade cyclododeca-1,5,9-triene was used.

Within about 40 minutes an uptake of only 36 atm. hydrogen took place and the rate of reaction slowed down. Therefore, another 5 g. of the above catalyst were added and the same steps were repeated. A sample was drawn at a hydrogen uptake of 146 atm. and analysed by gas-liquid chromotography.

The following results were obtained:

| Time of reaction in minutes | Hydrogen uptake in atm. | $n_D^{65}$ | Cyclododecane | Cyclododecene | Cyclododecadiene |
|---|---|---|---|---|---|
| 151 | 146 | 1.4667 | 14.5 | 76.5 | 9.0 |

From the Examples 14 and 15 it is evident that the technical grade starting material was contaminated by a constituent impairing the activity of the catalyst.

EXAMPLE 16

A stirred autoclave provided with a cooling and heating coil was charged with 6.5 kg. technical grade cyclododeca-1,5,9-triene (containing 97% of the cis, trans, trans-isomer and 3% of the trans, trans, trans-isomer) and 260 g. non-activated Cu/MgO/SiO$_2$ catalyst containing 40% copper.

The reactor was heated with steam to 180° C. under a hydrogen pressure of 5 atm. and kept at 180° C. for 20 min. while venting hydrogen gas to activate the catalyst. After 20 min. the temperature increased to 200° C. and the hydrogen pressure was maintained at 5 atm. After 70 min. at 200° C. the hydrogen pressure was released and the contents of the vessel quickly cooled to 100° C. and filtered free from catalyst. The product had the following characteristics: $n_D^{65}$ 1.4668, 16.5% cyclododecane, 76.5% cyclododecene, 6% dienes and 1% trienes (by gas-liquid chromatography).

EXAMPLE 17

A cascade of 5 continuous flow stirred tank reactors with a capacity of 6.5 kg. each was fed with technical grade cyclododeca-1,5,9-triene, as described in Example 16 at a rate of 17.5 kg./hour. The cyclododecatriene was mixed with 4% by weight non-activated Cu/MgO/SiO$_2$ catalyst (Example 16). The temperature of the reaction mixture in the cascade was brought at 200° C. and hydrogen was supplied at a pressure of 5 atm. and vented at a rate of 4 Nm.$^3$/h. After some time a product emerged from the fifth reactor that had the following characteristics: $n_D^{65}$ 1.4664, 21.5% cyclododecane, 70% cyclododecene, 7.5% dienes and 1% trienes.

What is claimed is:

1. Process for selectively hydrogenating alicyclic polyenes selected from the group consisting of cycloocta-1,5-diene and cyclododeca-1,5,9-triene to the corresponding cyclic monoolefins which comprises contacting the alicyclic polyenes at a temperature up to 300° C. and at a pressure up to about 200 atmospheres with a catalytically effective quantity of a metal catalyst the active component of which is copper in the absence of any other metal showing a higher activity than copper in a reaction medium consisting essentially of hydrogen in the absence of a solvent.

2. Process according to claim 1 wherein the duration of the hydrogenation is such that the product contains at least 75% of the corresponding cyclic monoolefin and not more than 12.5% of the alicyclic polyene.

3. Process according to claim 1 wherein the active material of the catalyst is dispersed on an inert carrier.

4. Process according to claim 3 wherein the catalyst is precipitated on a MgO/SiO$_2$ carrier.

5. Process according to claim 1 wherein the reaction is carried out at temperatures ranging between 150 and 220° C.

6. Process according to claim 1 wherein the hydrogenation is carried out at hydrogen partial pressures between 2 and 30 atmospheres.

7. Process according to claim 1 wherein the starting material is cyclododeca-1,5,9-triene.

8. Process according to claim 1 wherein the starting material is cycloocta-1,5-diene.

References Cited

UNITED STATES PATENTS

| | | |
|---|---|---|
| 3,022,359 | 2/1962 | Wiese. |
| 3,251,892 | 5/1966 | Seefelder. |
| 2,802,889 | 8/1957 | French _____ 260—677 |
| 3,218,268 | 11/1965 | Arnold. |
| 2,964,579 | 12/1960 | Kirsch. |
| 3,274,286 | 9/1966 | Reich. |
| 2,360,555 | 10/1944 | Evans. |

DELBERT E. GANTZ, Primary Examiner

V. O'KEEFE, Assistant Examiner

UNITED STATES PATENT OFFICE
CERTIFICATE OF CORRECTION

Patent No. 3,472,906                      October 14, 1969

Hiepke Boerma et al.

It is certified that error appears in the above identified patent and that said Letters Patent are hereby corrected as shown below:

Column 5, line 53, "with", second occurrence, should read -- and --. Column 6, line 55, after "cyclododeca" insert a dash. Column 7, line 16, "%" should read -- / --. Column 8, line 41, "83%" should read -- 82% --.

Signed and sealed this 12th day of May 1970.

(SEAL)
Attest:

Edward M. Fletcher, Jr.                WILLIAM E. SCHUYLER, JR.
Attesting Officer                          Commissioner of Patents